United States Patent
Cope et al.

(10) Patent No.: US 7,444,596 B1
(45) Date of Patent: Oct. 28, 2008

(54) USE OF TEMPLATE MESSAGES TO OPTIMIZE A SOFTWARE MESSAGING SYSTEM

(75) Inventors: Brian Charles Cope, Hampshire (GB); Saket Rungta, Rajasthan (IN); Matthew Brian White, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/947,639

(22) Filed: Nov. 29, 2007

(51) Int. Cl.
*G06F 3/048* (2006.01)
*G06F 17/00* (2006.01)

(52) U.S. Cl. .................... 715/764; 715/235

(58) Field of Classification Search .......... 715/235, 715/752, 764
See application file for complete search history.

(56) References Cited

U.S. PATENT DOCUMENTS

| | | | |
|---|---|---|---|
| 3,483,317 A | 12/1969 | DeGrout | |
| 5,165,018 A | 11/1992 | Simor | |
| 5,235,695 A | 8/1993 | Pence | |
| 5,247,638 A | 9/1993 | O'Brien et al. | |
| 5,298,895 A | 3/1994 | Van Maren | |
| 5,608,396 A | 3/1997 | Cheng et al. | |
| 5,635,931 A | 6/1997 | Franaszek et al. | |
| 5,845,303 A * | 12/1998 | Templeman | 715/255 |
| 6,199,082 B1 * | 3/2001 | Ferrel et al. | 715/205 |
| 6,523,102 B1 | 2/2003 | Dye et al. | |
| 6,976,081 B2 * | 12/2005 | Worger et al. | 709/230 |
| 7,257,693 B2 | 8/2007 | Newburn et al. | |
| 2001/0046875 A1 | 11/2001 | Davies | |
| 2002/0107877 A1 | 8/2002 | Whiting et al. | |
| 2004/0015717 A1 | 1/2004 | Colas et al. | |
| 2004/0059750 A1 | 3/2004 | Tarin | |
| 2004/0147247 A1 | 7/2004 | Demetrescu et al. | |
| 2004/0148303 A1 | 7/2004 | McKay et al. | |
| 2004/0255209 A1 | 12/2004 | Gross | |
| 2005/0203673 A1 | 9/2005 | El-Hajj et al. | |
| 2005/0216669 A1 | 9/2005 | Zhu et al. | |
| 2006/0240805 A1 | 10/2006 | Backholm et al. | |
| 2007/0055929 A1 * | 3/2007 | Giannetti et al. | 715/517 |
| 2007/0100866 A1 | 5/2007 | Binding et al. | |
| 2007/0220027 A1 | 9/2007 | Richey et al. | |

(Continued)

OTHER PUBLICATIONS

Kim et al., "Template Based High Performance ALE-TSOAP Message Communication," Software Engineering Research, Management and Applications, 2007. SERA 2007. 5th ACIS International Conference, Aug. 20-22, 2007, pp. 534-541.

(Continued)

*Primary Examiner*—William L. Bashore
*Assistant Examiner*—Boris Pesin
(74) *Attorney, Agent, or Firm*—Scully, Scott, Murphy & Presser, P.C.; A. Bruce Clay

(57) ABSTRACT

A method uses template messages to optimize software messaging system. A message is decomposed into a template message portion containing message content, and a field message portion. A correlation identifier identifies a template message and only those template messages with unique correlation identifiers are stored or forwarded. A field message portion includes a correlation identifier associated with a template message. A recomposition function combines a field message portion with the appropriate template message portion as identified in the field message portion.

1 Claim, 1 Drawing Sheet

U.S. PATENT DOCUMENTS

2007/0245090 A1 10/2007 King et al.
2008/0005265 A1* 1/2008 Miettinen et al. ........... 709/217

OTHER PUBLICATIONS

Ogawa, H., et al., "Ompi: Optimizing Mpi Programs Using Partial Evaluation," Proceedings of the 1996 ACM/IEEE conference, 1996, pp.37.

Payne, T.R., et al., "Facilitating Message Exchange though Middle Agents," AAMAS'02, Jul. 15-19, 2002.

Sadiq, S., et al., "Facilitating Business Process Management with Harmonized Messaging," 6th International Conference on Enterprise Information (2004).

Sivashanmugam, S., "The METEORS Framework for Semantic Web Process Composition (2003),".

Suzumura, T., et al., "Optimizing Web Services Performance by Differential Deserialization," Proceedings of the IEEE International Conference on Web (2005), pp. 185-192.

* cited by examiner

USE OF TEMPLATE MESSAGES TO OPTIMIZE A SOFTWARE MESSAGING SYSTEM

FIELD OF THE INVENTION

The present application relates to distributed applications and more particularly to using template messages to optimize messaging.

BACKGROUND OF THE INVENTION

Distributed software applications often interact across computer networks via asynchronous messaging protocols. Typically, those distributed messaging applications are designed such that the sender and receiver parts of the applications agree on the content and format of the messages to be exchanged. In message passing, it is often the case that a series of messages will be sent, only to have each message differ from the rest by a few key fields. That is, the bulk of the message remains the same across all messages in the series. In such a case, sending the entire message each time is clearly inefficient. Therefore, what is desirable is a method that efficiently handles messages in such situations.

BRIEF SUMMARY OF THE INVENTION

A method of optimizing a software messaging system is provided. The method in one aspect may comprise autonomously detecting patterns of repeated data in a plurality of messages; generating a plurality of template messages, each of said plurality of template messages containing a different pattern of repeated data detected in said plurality of messages; assigning a correlation identifier to said each template message. Said generating may further include replacing a template message with one determined to have more of commonly repeated data. The method may also include storing said each template message identified by a corresponding correlation identifier.

The method may further comprise, for each message being communicated, extracting dynamic portion of said each message and generating a field message to contain the dynamic portion; selecting a template message from said plurality of template messages having message content of said each message; associating a correlation identifier identifying said selected template message with said field message; and communicating said field message to a recipient application.

The method may further comprise, recomposing said each message using said field message and said correlation identifier. The step of recomposing may further include searching recipient application's cache storing a plurality of template messages to select a template message identified by said correlation identifier.

The method may also comprise notifying said recipient application when there is a change in one or more of the template messages cached in said recipient application's cache.

Further features as well as the structure and operation of various embodiments are described in detail below with reference to the accompanying drawings. In the drawings, like reference numbers indicate identical or functionally similar elements.

DETAILED DESCRIPTION

Figure 1:
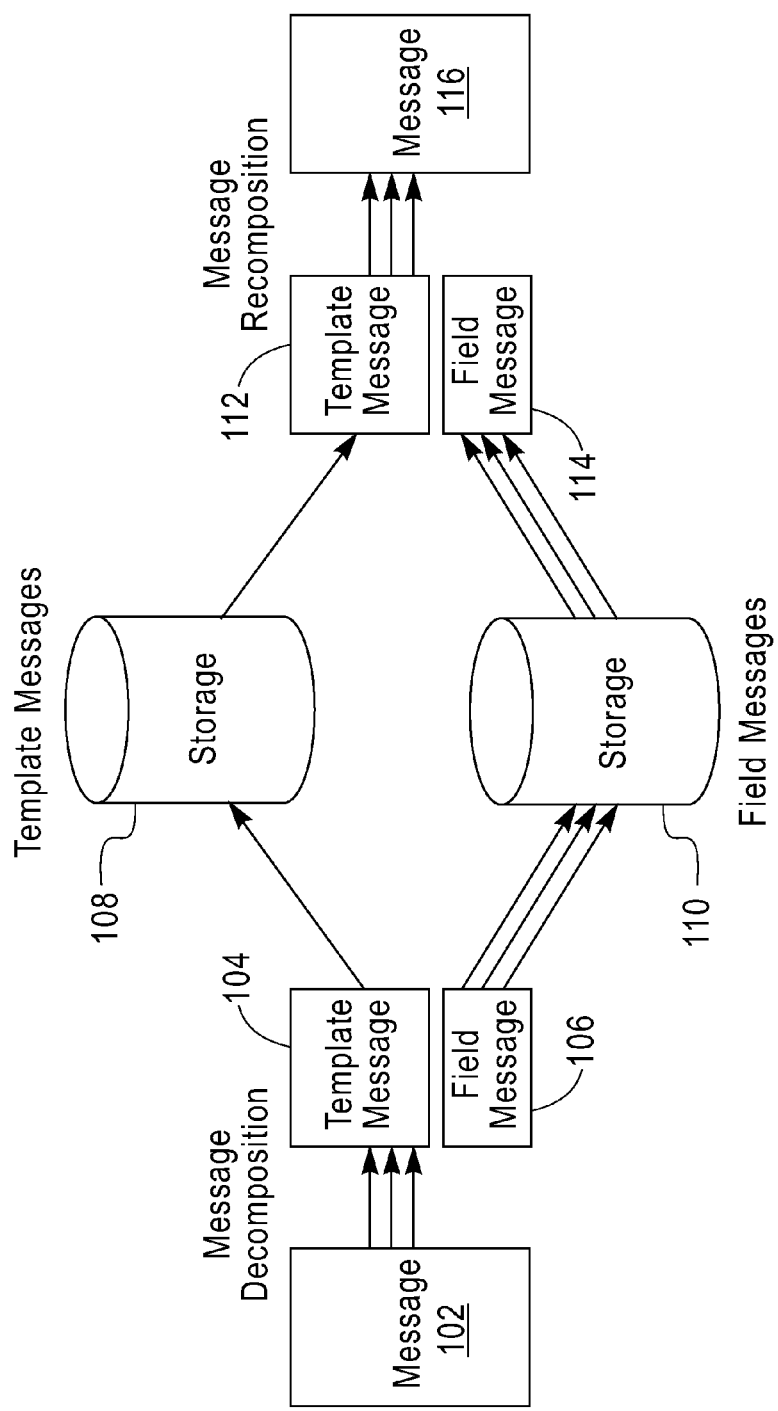
FIG. 1 is a block diagram illustrating message decomposition and recomposition of the present disclosure.

A method for sending smaller messages in which a series of messages largely contain the same content is provided. Using smaller sized messages to communicate exactly the same information as the larger sized predecessor, albeit with an additional indirection, can have a major impact on the achievable message throughput rate and also on the cost of running the application, since network usage is often charged by volume transferred. In addition to the performance gains in terms of bandwidth reduction due to smaller size, there is an additional gain, for free, due to the underlying caching mechanism of typical messaging systems. Messaging systems typically have a memory cache of limited size, beyond which messages must be spilled onto the disk. Accessing disk storage is orders of magnitude slower than direct memory access. By restricting the size of the messages flowing around the system, the cache usage is optimized as well as the network usage.

A method of the present disclosure in one embodiment enables applications to exchange messages in two parts; a set of "template messages", which contain the bulk of the data to be exchanged, which only change content infrequently, or which need to be centrally administered for consistency of formats between applications; and the series of "field messages", which contain the subset of message data which changes for every message. An existing messaging system or software may be augmented to provide such functionality. The scope of usage of the template messages, or the realm of applicability of the template messages, may be the entire messaging system or a logical group of messaging component(s), and is not limited to a single or a set of queue(s), topic(s) or application(s).

FIG. 1 is a block diagram illustrating message decomposition and recomposition of the present disclosure. A message 102 may be decomposed into two parts, a template message containing content portion of the message 104 and a field message 106 containing information or attributes related to the message. Template messages may be stored at 108 and field messages may be stored at 110. The storage 108, 110 may be any one or combination of database, a queue, or cache memory, or like, for instance, depending on the specific implementation of the method. A decomposed message may be recomposed by combining a template message retrieved from the template message store 112 and field message 114 retrieved from the store 110. A template message is identified in a field message by a unique identifier.

Consider a series of messages describing a sale of items by auction. The main message may be boilerplate material describing the nature of the sale, the obligations of the seller and buyer, etc., and the only part of the message that changes in each message may be item name, item number, brief description, reserve price, sale price, seller id, buyer id. In this example, the boilerplate material may form a template message; and the item name, item number, brief description, reserve price sale price, seller id, buyer id may form the field message.

As another example, consider a series of messages describing training achievements by employees. The main body of each message may include the course name, description, prerequisites, etc., which can be designated for being a template message. Unique or different parts of the message such as the trainee name, date taken, examination score, etc., would be placed in the field message.

In one embodiment a sending application may send its set of template messages to a known queue or repository on the messaging system. A set contains one or many. Each template message includes a unique correlation identifier (id). A sending and receiving applications may use an existing pre-defined repository of template messages. The repository of template messages may be shared among applications or global to all applications. An administrator or an application with sufficient authority may add, remove or modify the template messages directly. In order to send the main sequence of messages to the recipient application, the sending application sends field messages 106, each with a correlation id to match the relevant template message 104. The main message flows around the system are therefore the field messages, which are typically small, thus providing the required optimizations.

In order to rebuild the complete messages, the system browses the queue (or repository or cache memory or like) of template messages to pick up the template messages it needs non-destructively, as well as destructively getting the field messages containing the dynamic data. By examining the correlation id of the field messages, the appropriate template message is looked up, and a known or will be known algorithm is used to insert the contents of the field messages 114 into the specified template message 112 in order to build the complete messages 116 for the recipient to use. The method of the present disclosure may be implemented within, or making use of, a current messaging middleware technology, such as IBM's WebSphere MQ™ product.

As an example, the following algorithm or method may be used to combine field messages with template messages. A sending application decomposes its text-based messages according to a set of named fields listed in the appropriate template message. For each named field, its value is removed from the original message and added to a field message as a name/value pair, i.e., field name and value corresponding to that field. A template message may contain named tags or tokens, typically with special delimiters such as <and >, in the places where the fields would be in the full messages. In recomposing at the destination, the template message is parsed to find the token delimiters, the token name between each pair is read and the token with the value from the field message matching the token name is substituted.

For example,
Original message may include:

... content ...

The item Rocking Chair was sold for $405 by Mrs. A Smith.

... content

Template message for the above original message may be:

CorrelId=AuctionSale

... content ...

The item <ItemName> was sold for $<Price> by <Seller>.

... content ...

Field message corresponding to the original message then may be:

CorrelId=AuctionSale

ItemName=Rocking Chair

Price=405

Seller=Mrs. A Smith

In another example, a sending application decomposes its data structured messages by comparing a sequence of similar messages to identify those data fields that differ between messages. Those fields that are common to all messages in the sequence are entered into a template message, with named placeholders, typically with a token indicating their location, for the differing fields. These differing fields are put into field messages. The recomposing application replaces the placeholders in a template message with the equivalent fields from the current field message, either by name or simply by sequence order.

For example,
Original message may include:

Inventing For Beginners

This course instructs . . .

. . .

Andrea Smith

27 Oct. 1998

Pass

This qualification . . .

. . .

Template message for the original message may be:

CorrelId=1295

Inventing For Beginners

This course instructs . . .

. . .

>Trainee

>Date

>P/F

This qualification . . .

. . .

Field message corresponding to the original message may then be:

CorrelId=1295

Andrea Smith

27 Oct. 1998

Pass

In one embodiment, template messages and field messages are stored on the messaging system's queues, and the receiving application retrieves both the template messages (non-destructively) and the field messages (destructively), and performs the message composition within the bounds of the receiving application.

In another embodiment, the receiving application may cache the template messages as it gets them. An agent or a process may be deployed to notify the receiving application when template messages change. Upon being notified, the receiving application can clear the template messages from its cache. Rather than having a separate agent or process notify the receiving application of the changes in the template messages, a sender application may send an additional notification message via the messaging system whenever a template message is changed. This scheme significantly improves network bandwidth usage between queues and receiver, and is particularly efficient when template messages change very infrequently.

Yet in another embodiment, the messaging system may perform the message composition on behalf of the receiving application. In this embodiment, assuming that the messaging system performs the composition on the same computer as the receiving application (i.e., within the receiving client portion of the distributed messaging system), the network bandwidth is similar to the above embodiment. An advantage of this embodiment is that the complexity is removed from the specific application and provided within the generic messaging system. In one embodiment, the algorithm(s) for composing field messages into their template messages are generic so they can be built into the messaging system without knowledge of the specific formats required by applications.

Still yet in another embodiment, a messaging system composes the messages on the messaging server (i.e., on the computer storing the queues of messages). This has the advantage of keeping the complexity on the server system, allowing centralization of the main messaging processing, and keeping the client software running with the applications as simple and small as possible.

Another embodiment may have the messaging system perform both message decomposition from fill messages sent by a sending application into template messages and field messages, and message recomposition on behalf of the receiving application. In this embodiment, the sending and receiving applications are relatively unaware of the decomposition and recomposition process, in that they send and receive fill messages. However, the sending application indicates which templates and/or algorithms the messaging system should use for transmission of its messages. In this embodiment, the method becomes largely an internal optimization process within the messaging system to enable applications to minimize the network bandwidth and storage used by the messages. The caching and template message update methodology described above may be applied within this embodiment.

In another embodiment, a messaging system exercises autonomous selection of decomposition algorithms. As a series of messages is sent through the system, patterns of repeated data are detected by the system. The repeated data is then extracted into template messages, and subsequent messages following the same patterns have their dynamic data extracted into field messages for forwarding, associated with the relevant template messages for recomposition at the receiving end before delivery to the receiving application.

Pattern recognition may be as simple as monitoring a sequence of messages flowing from a sending application and comparing their contents, either character by character or, in a structured message, field by field maybe used for autonomous selection of decomposition algorithms. As each message is examined, a template message is built up to contain those elements of the messages that are completely common across all messages. During this phase of operation, messages may be sent complete rather than using templates and fields. Once some n messages or predetermined number of messages are detected with a threshold of m % of their content completely common, then that template message is brought into full use. Any subsequent messages also completely matching that template will have their non-common content extracted into field messages and sent in that form for recomposition with the template message using algorithms such as those described above. During pattern recognition, multiple template messages may be built to match different patterns. An algorithm can be tuned using various thresholds to distinguish between different patterns/templates, to determine when to start and stop using templates, when to replace a template with one with even more common content, etc.

In one embodiment, template cache management may be implemented by keeping the master copy of all template messages on a queue. The receiving application, when it gets a field message to recompose, looks for the template message with a matching correlation id in its local cache. If it is found, then that template message is used for recomposition. If not, then the template message queue is browsed to find that template message by correlation id, and a copy is placed in the local cache for future use, then recomposition continues.

If the sending application (or some other template management system) needs to change a template message, then it also sends a notification message to those applications using the template message queue. That notification will identify, by correlation id, the template message that has been changed, and the receiving applications will simply remove that template message from their local caches. Next time that template message is required, the changed copy will be retrieved from the queue since there will not be a cached copy.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of optimizing a software messaging system, comprising:

autonomously detecting patterns of repeated data in a plurality of messages;

generating a plurality of template messages, each of said plurality of template messages containing a different pattern of repeated data detected in said plurality of messages, said generating further including replacing a template message with one determined to have more of commonly repeated data;

assigning a correlation identifier to said each template message;

storing said each template message with a corresponding correlation identifier;

for each message being communicated, extracting dynamic portion of said each message and generating a field message to contain the dynamic portion;

selecting a template message from said plurality of template messages having message content of said each message;

determining a correlation identifier assigned to said selected template message; and communicating said field message to a recipient application with the correlation identifier that matches the selected template message without communicating content of said selected template message;

recomposing said each message using said field message and said correlation identifier, said recomposing step further including searching recipient application's cache storing a plurality of template messages to select a template message having said correlation identifier, said recomposing step further including non-destructively retrieving said template message having said correlation identifier and destructively retrieving said field message, said recomposing step further including replacing placeholders in said template message with equivalent fields from said field message by sequence order; and notifying said recipient application when there is a change in one or more of the template messages cached in said recipient application's cache, said notifying being performed by an agent process deployed to notify said recipient application of one or more changes in the plurality of template messages, said recipient application clearing said one or more of the template messages that have changed from its cache upon being notified, the steps of autonomously detecting patterns, generating a plurality of template messages, assigning a correlation identifier, and storing being performed as said each message is being communicated.

\* \* \* \* \*